United States Patent Office 3,594,299
Patented July 20, 1971

3,594,299
APPARATUS FOR ELECTRICAL MACHINING OF METALLIC WORKPIECES
Kiyoshi Inoue, 182, 3-chome, Tamagawayoga-machi, Satagaya-ku, Tokyo-to, Japan
Original application Jan. 19, 1966, Ser. No. 535,268, now Patent No. 3,417,006, dated Dec. 17, 1968. Divided and this application Aug. 30, 1968, Ser. No. 824,014
Claims priority, application Japan, Jan. 20, 1965, 40/2,947
Int. Cl. B23p 1/04; B01k 3/00
U.S. Cl. 204—224                4 Claims

ABSTRACT OF THE DISCLOSURE

An apparatus for electrically machining a metallic workpiece in which a first source of electric current is connected between the workpiece and the tool electrode for electrochemical erosion as the workpiece is juxtaposed with the tool electrode and in contact with an electrolyte. A second source of electric current applies spark discharge pulses in addition.

---

This application is a division of application Ser. No. 535,268, filed Jan. 19, 1966, now U.S. Patent No. 3,417,006.

The present invention relates to a method of and an apparatus for the high-rate accurate electrical machining of workpieces and, more particularly, to a method of and an apparatus for electrochemical/spark-discharge erosion of material from a conductive workpiece.

With the advent of electrochemical and spark-discharge techniques for the erosion of workpieces, e.g. for the sinking of dies, machining of workpiece surfaces, reproduction of intricate shapes and the like, it has become clear that each of these electrical erosion techniques has certain advantages and disadvantages which render the technique effective for some purposes and ineffective for others. For example, spark-discharge machining is capable of producing a relatively fine finish and of machining a workpiece with a high degree of accuracy with respect to reproduction of the contours of an electrode and the sharpness of the corners of any contour formed by this method. On the other hand, the erosion rate, in terms of quantity of workpiece material removed per unit time, is relatively low. The term "spark-discharge machining" is used herein to designate machining methods wherein an electrode is juxtaposed with a workpiece and a dielectric liquid (i.e. a coolant such as kerosene having a high dielectric constant and electrical resistivity) is used to carry away eroded particles and to provide a medium whose breakdown voltages is sufficiently high to ensure relatively high-energy discharges.

In electrochemical-machining processes, the cooling medium and flushing liquid is constituted by an electrolyte inasmuch as the erosion at the workpiece surface is an electrolysis which causes ions of the workpiece material to enter solution. Electrochemical-machining processes have the advantage that they afford a higher rate of removal of the workpiece material but are, in turn, characterized by a loss of accuracy. For example, the flow of the conductive liquid causes a rounding-off of the corners of contours formed by an electrochemical-machining operation and even corners of a workpiece remote from the electrode as a consequence of spurious ion-current flows through the electrolyte at remote locations.

To overcome the disadvantges of the poor accuracy obtained heretofore by electrochemical machining, and the disadvantages resulting from the low erosion rate of spark-discharge techniques, it has been proposed to combine the two into what has been termed, for convenience, electrochemical discharge machining (ECDM). In accordance with such system, electrochemical machining is carried out in an apparatus through which an electrolyte is circulated to serve as a coolant and a direct-current machining potential is applied across the electrode and the workpiece to effect the electrolysis. After the machining operation has roughed out the workpieces, the electrolyte is removed and replaced by a dielectric (nonconductive medium) and the power supply is switched over to impress current pulses across the machining gap in order to effect a spark-discharge erosion for finishing the desired contours. It will be evident, however, that such a technique—while providing for effective use of the apparatus—does not really overcome the separate disadvantages of electrochemical machining (ECM) and electric-discharge machining (EDM).

It is the principal object of the present invention, therefore, to provide an improved method of and apparatus for the electrical machining of a workpiece at a relatively high rate and with a relatively high reproduction accuracy, together with obtention of a superior finish.

A further object of this invention is to provide an electrical-machining technique which overcomes some of the more significant disadvantages of earlier ECM and EDM methods.

These objects and others which will become apparent hereinafter are attained in accordance with the present invention which is based upon my surprising discovery that it is possible to effect simultaneously a spark-discharge erosion and an electrolytic erosion of the workpiece surface at a rate comparable favorably to that of electrochemical methods but affording improved finish with an accuracy closely comparable with that obtained by low-rate spark-discharge machining operations. The surprising nature of this discovery will be all the more evident from the fact that it has hitherto been believed that spark-discharge machining could not be carried out effectively unless the medium in the gap was so highly nonconductive (insulating) that spurious ion currents could not develop across the gap and that electro-chemical erosion could not be carried out efficiently unless the ion mobility in the solution and thus the current flow across the gap was at a maximum.

My present invention is based upon the finding that, when the medium is an aqueous solution having a conductivity or resistivity equivalent to substantially $10^{-1}$ to $10^{2}$ $\Omega$-cm. (specific resistivity) and the electric current impressed upon the electrode and workpiece includes a relatively prolonged DC (unidirectional) current pulse (poled so as to electrolytically erode the workpiece surface) and a pulse train of pulses of shorter duration than the DC component but capable of effecting discharge across the gaps, such spark discharging occurs simultaneously with an electrolytic erosion of the workpiece and apparently operates together with this electrolytic erosion so as to provide a finish and accuracy significantly higher than that which has been observed heretofore in conventional ECM systems (electrochemical cavity sinking or grinding). It will be understood that this result is obtainable only within the critical range of electrolyte resistivity mentioned above. Furthermore, in prior systems spurious arcs tend to develop in electrolytic processes and must be suppressed to prevent these processes from becoming inoperative. For example, it is known that an electrolytic process occasionally experiences a current surge which may cause an arc to develop across the gap and form a bypass for the current flow so that the electrolytic operation is rendered ineffective, and some earlier systems involving electrolytic erosion of material have provided means for preventing such surges to bar the formation of arcs of this nature. Such arcs do not, moreover, have the effect of a succession of regularly generated spark discharges which, in accordance with the principal object of the present invention are impressed to effect an accurate machining of the workpiece surface. This is ensured by impressing a succession of pulses across the gap in addition to the electrolytic-erosion potential. Thus, a power supply for a system in accordance with the present invention, can be considered to include both a source of electrolytic-machining unidirectional potentional and a source of breakdown pulses of high repetition frequency, as will become apparent hereinafter.

According to a further feature of this invention, the breakdown pulses impressed upon the tool/workpiece system have pulse durations of the order of microseconds (between 1 and $10^3$) whereas the unidirectional-current pulses are of the order of milliseconds (between 1 and $10^3$); a suitable pulse width for the unidirectional electrochemical-machining face is about 5 milliseconds while the pulse train for producing the spark discharges so composed of pulses has a duration of substantially 5 microseconds. It will be understood, however, that the pulse duration of the latter spikes will range between 1 microsecond and hundreds of microseconds for usual workpieces (stainless steel, tungsten, carbide, tool steel etc.).

Moreover, the present invention provides an apparatus for the electrochemical-discharge machining of a workpiece which includes means for circulating the coolant medium and is provided with a conductivity cell or other sensor responsive to the conductivity of specific resistivity of the coolant as well as means controllable by such sensor for modifying the composition of the coolant to restore the specific resistivity to the range of $10^{-1}$ and $10^2$ ohm-cm. and, still better, between 1 and 100 ohm-cm. The last-mentioned means may include a source of a conductive substance and a source of an insulating substance which selectively dispense their respective substances into the coolant line in accordance with the modification of the conductivity thereof desired. The conductive substance may be a saline aqueous solution or a solution of other inorganic substances (acids or bases) while the insulating substance is most advantageously deionized water. Aqueous solutions of alkali-metal nitrites, nitrates, carbonates, phosphates, sulfates and sulfites, and hydroxides are, for example, suitable.

The above and other objects, features and advantages of the present invention will become more readily apparent from the following description and specific example, reference being made to the accompanying drawing in which.

Figure 1:
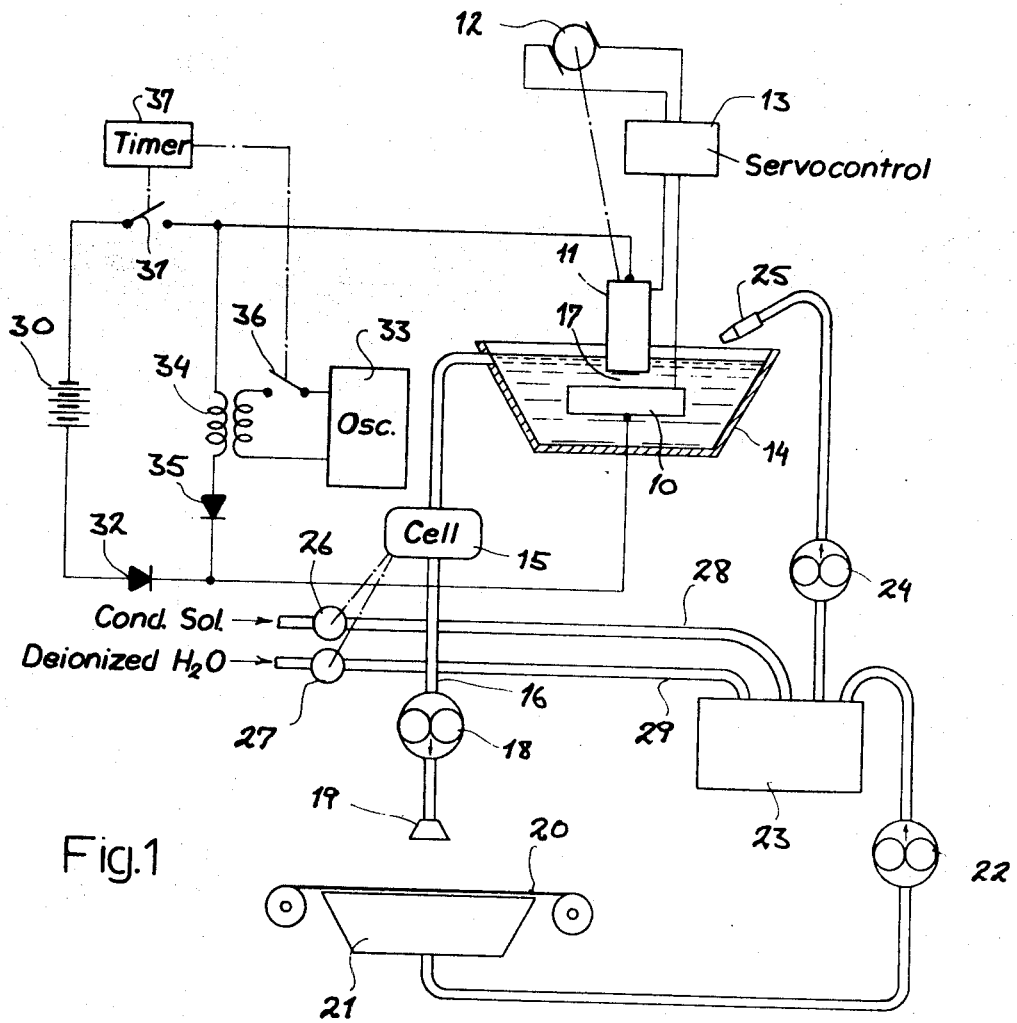
FIG. 1 is a circuit diagram diagrammatically illustrating certain principles of the present invention.

In FIG. 1, I show the basic components of an apparatus for the simultaneous electrochemical and spark-discharge machining of a workpiece 10. In this system, the workpiece 10 is spacedly juxtaposed with an electrode 11 with a machining gap 7 being maintained in a conventional manner in a servomotor 12 coupled with the electrode 11. A servocontrol (sensor and amplifier) 13 is provided for operating the motor 12 in response to changes in the gap 17 conditions to maintain the machining gap substantially constant. It will be understood, however, that other methods of maintaining the gap may also be employed and that systems in which the gap is formed by pockets at the electrode/workpiece interface sweeping along the workpiece may also be employed. In this latter system, the electrode has a specific resistivity essentially of the order of that of the conductive medium so that it can directly contact the workpiece without cutting off electrochemical-machining operations within the electrolyte pockets.

The constant medium for the system of this invention is collected from the workpiece gap 17 by a trough or vessel 14 and passes through a conductivity cell 15 in the return line 16 of the medium-circulating system. The conductivity cell 15 is responsive to the specific conductivity or specific resistivity of the constant medium, which here serves both as the medium for spark discharge and as the medium for electrolytic erosion, to maintain the specific resistivity of the medium substantially constant and within the range indicated above to be critical for the purposes of the present invention. The medium withdrawn from the vessel 14 contains particles of the workpiece material and, generally, also electrode material produced at the machining gap 17. The liquid is displaced by a pump 18 in this return line to an outlet 19 which dispenses a stream of the liquid against a moving filter band 20 which can be constituted as a fabric web. This band collects the particles in a convenient manner. From the vessel 21 below the band, the machining medium is conveyed by a pump 22 to the storage reservoir 23 of the coolant system. A further pump 24 displaces coolant from reservoir 23 to the workpiece gap 17 via a nozzle 25 which directs a jet of the coolant at this gap. When the specific resistivity of the coolant must be adjusted to maintain the predetermined range, the conductivity cell 15 selectively operates valves 26 and 27 in supply lines 28, 29, respectively, adapted to dispense a conductive solution (e.g. an aqueous saline solution) and an insulating liquid (e.g. deionized water) into the reservoir 23 to modify the specific resistivity of the circulated machining medium.

Figure 6:
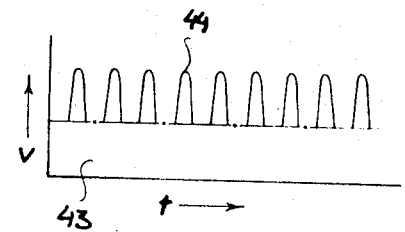
FIG. 6 is a graph similar to FIG. 5 illustrating another suitable wave form.
Figure 5:
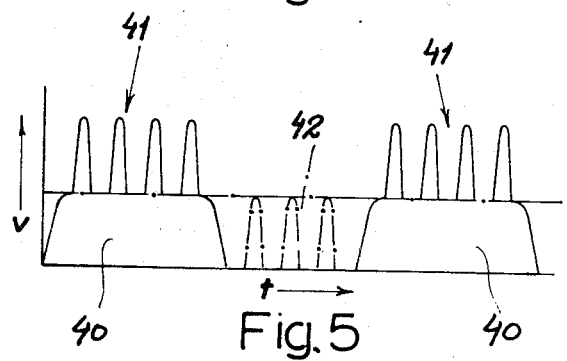
FIG. 5 is a graph showing the wave form obtainable from this power supply.
Figure 7:
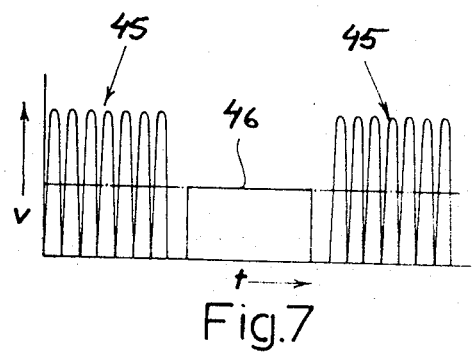
FIG. 7 is a diagram of the wave form of still another system according to the present invention.

A power supply for a system in accordance with the present invention can basically comprise a source of unidirectional, electrochemical-machining potential such as a battery 30 which is connectable across the electrode/workpiece system 10, 11 via a switch 31 and a spike-blocking rectifier diode 32. The spark-discharge spikes or pulses can be supplied by any oscillating system including a multivibrator oscillator, relaxation circuit or the like, represented as an oscillator 33 inductively coupled to the system via a transformer 34, a rectifier 35 for eliminating the negative peak and a switch 36. As previously indicated, it has been found to be desirable to pulse the discharge spikes at a relatively high rate, e.g. characteristic of the oscillation frequency of the oscillation, while the electrochemical-machining current is pulsed at a relatively low rate. For this purpose, timer means of any conventional type (e.g. electronic switching devices) can be provided, as diagrammatically indicated at 37. In this system, the timer 37 operates the switch 31 to open and close it at a rate, for example, in the millisecond-range to apply D-C pulses, as shown at 40 in FIG. 5. FIGS. 5–7 show various wave forms with which the system of the present invention is operative, and represent plots of the voltage applied across the machining gap (along the ordinate) against time (along the abscissa). The train of electrochemical machining pulses 40 has a pulse duration on the order of milliseconds or greater, with a spacing between the pulses of a corresponding order of magnitude. Incidentally, the use of expression such as "electrochemical machining pulses" and "spark-discharge pulses" are not to be construed as indicating that these pulses operate with mutual exclusivity. A large measure of the success of the present invention appears to derive from the contributions of the discharge pulses in electrochemical machining, not only to break up an ion contamination and ion barrier and to penetrate oxide films and the like, but also in the provision of part of the electrochemical machining current. Correlatively, the relatively prolonged D-C pulses appear to facilitate the action of the discharge-inducing pulses when the two are superimposed. The superimposition of a train of pulses 41 is effected via the oscillator 33 so that, when switches 31 and 36 are closed simultaneously and for corresponding periods, a machining current corresponding ideally to that of FIG. 5 is produced. In this arrangement, the level of the relatively long electrochemical-machining pulses is represented by the dot-dash lines and the spikes of pulse train 40 are of a magnitude sufficient when added to the long unidirectional pulse to effect breakdown through the medium in the gap. It will be understood, however, that switch 36 can be maintained in a closed condition even during periods of switch 31 so that the pulse group 42 of spikes shown in dot-dash lines is produced between the primary machining pulses. This pulse group 42, in effect, is capable of carrying out electrochemical machining with minimum build-up of ion barriers even though the amplitude of the spikes is less than that which would normally be required to effect the breakdown. Thus, there will be an intervening period of electrochemical machining between periods of simultaneous spark-discharge and electrochemical machining.

Furthermore, switches 31 and 36 may both be closed continuously during the operation in which case the wave form of FIG. 6 is obtainable. Here the D-C voltage 43 is continuous and the high-repetition-frequency train 44 of spark-inducing pulsating current is superimposed continuously thereon. In the arrangement of FIG. 7, switches 31 and 36 are alternatively closed to produce pulse bundles 45 of spark-inducing spikes between prolonged pulses 46 of the electrochemical machining current. In this case, as in the case of FIG. 5, the bundles of spark-inducing pulses may have a repetition frequency on the order of that of the electrochemical machining pulses.

Figure 2:
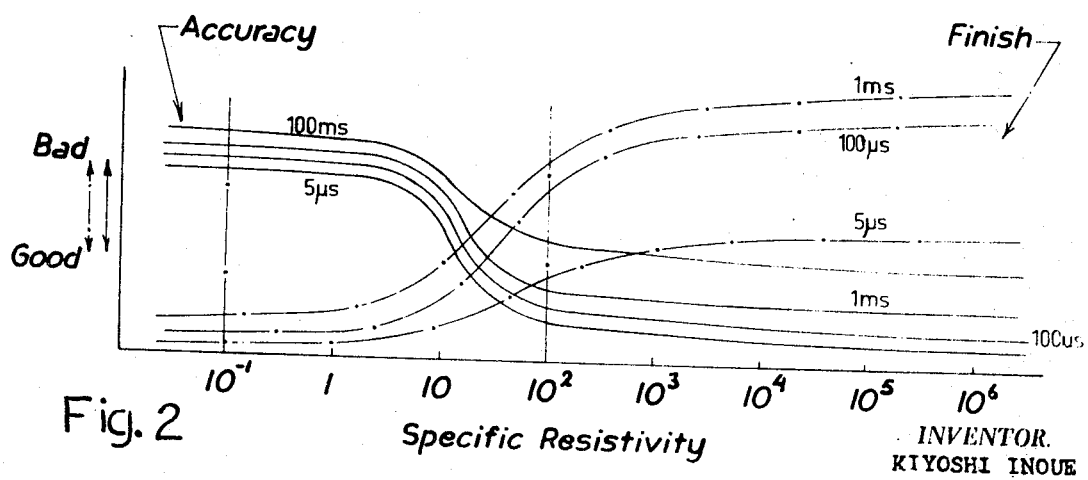
FIG. 2 is a graph further explaining the principles of the present invention.
Figure 3:
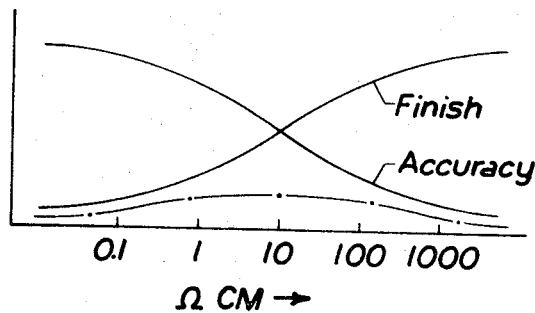
FIG. 3 is a graph similar to FIG. 2 but in somewhat enlarged idealized form.

In FIGS. 2 and 3, I show the results obtainable with a system of the present invention and a possible explanation of the surprising results obtainable in accordance therewith. In FIG. 2, the quality of the finish (dot-dash lines) and the machining accuracy (solid lines) are plotted along the ordinate against specific resistivity of the machining medium along the abscissa. The individual curves represent unidirectional pulses of the pulse frequency indicated. From the graph, it will be evident that at normal electrochemical machining ranges (i.e. with electrolyte whose specific resistivity is well below $10^{-1}$ ohm-cm.). The accuracy of machining is relatively low whereas, at electrode-discharge machining ranges (using dielectric medium with a specific resistivity well above $10^4$ ohm-cm.) the finish suffers. In FIG. 3, I show the transition range between dielectrics and electrolytes with respect to finish and accuracy and the results obtainable with the system of this invention may generally be considered to correspond to the dot-dash line of FIG. 3 in that relatively good finishes are obtainable with high accuracy. Moreover, these improved qualitative results are obtainable simultaneously with a machining rate roughly comparable to that obtainable with electrochemical machining methods.

Figure 4:
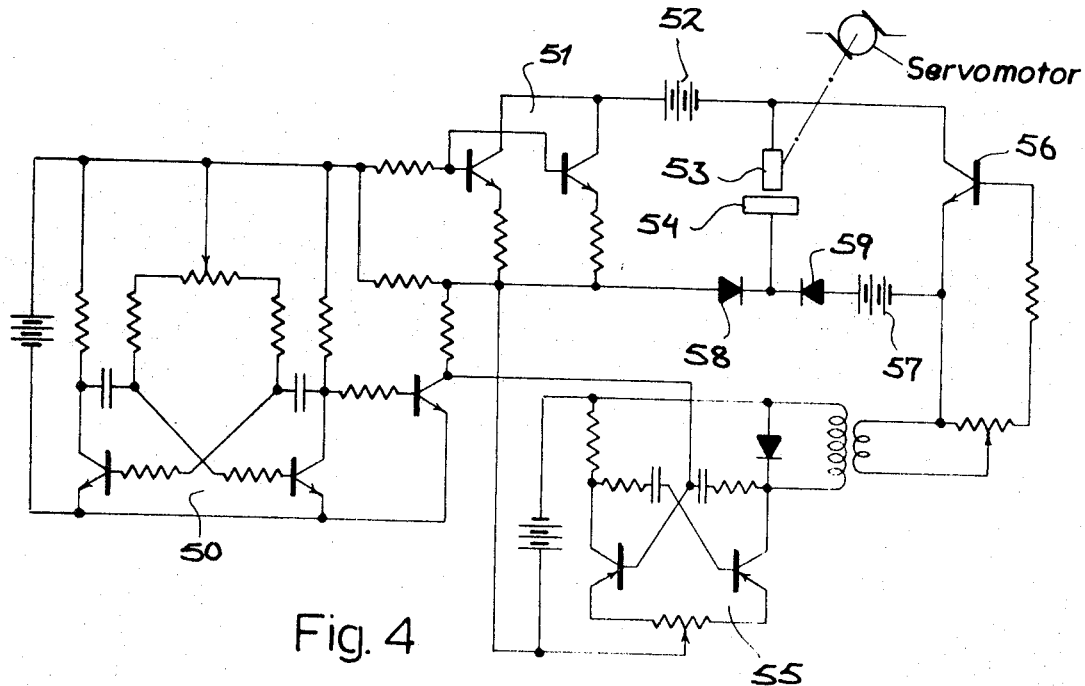
FIG. 4 is a circuit diagram of another power supply arrangement in accordance with this invention.

In FIG. 4, there is shown a solid-state power supply for carrying out the present invention. In this system, the source of low-rate electrochemical machining pulses is a multivibrator 50 adapted to trigger a plurality of parallel-connected transistor switches 51 to connect a high-current low-voltage source 52 across the electrode/workpiece system 54. The number of electronic switches 51 connected in parallel for simultaneous energization by the timer constituted by astable multivibrator 50 will, of course, depend upon the current to be delivered during these electrochemical-machining pulses and the individual capacity of the switching transistors. The multivibrator 50 will have the relatively low repetition frequency of the electrochemical-machining sources previously described. The spark-discharge pulses are produced by a further astable multivibrator 55 which is transformer-coupled to an electronic switch (transistor) 56 for connecting the source 57 across the electrode 53 and the workpiece 54. Rectifiers 58 and 59 are provided correspondingly for the purposes set forth for the rectifiers 32 and 35. The system of FIG. 4 operates essentially as previously described.

EXAMPLE

A stainless-steel workpiece was juxtaposed with a tubular brass electrode of cylindrical configuration with an outside diameter of 0.5 mm. and an inner diameter of about 0.2 mm. for the boring of a hole in the workpiece by electrochemical-discharge machining. An aqueous solution, at room temperature, of potassium nitrate having a specific resistivity of 25 ohm-cm. was employed as the machining medium and was supplied to the machining gap with a liquid pressure of 1.1 kg./cm.$^2$ as it was forced through the electrode. The workpiece thickness was 15 mm. and the machining current comprised a train of spark-inducing pulses with a frequency of 10 kc./sec., a peak voltage of 700 volts and a mean current of 3 amperes. The D-C electrochemical machining component had a power (product of mean voltage and amperage) of approximately 10% of the spark-discharge pulsating potential. The spark-discharge potential and D-C pulses were simultaneously applied, as illustrated in FIG. 5, with an on-time/off-time ratio of substantially 1:0.5. The workpiece was pierced through by the tool in about 7 minutes and the roughness of the wall of the resulting bore was found to be less than 1 micron $H_{max}$ and the finish relatively bright. The diameter of the bore was 0.58 mm. and considered to be a relatively good reproduction of the tool dimension.

When a test was made using a corresponding workpiece, the same electrode and kerosene as the coolant medium for the EDM process alone, the machining time required for penetration was 98 minutes, the roughness was found to be 7 microns $H_{max}$ and the diameter of the bore to be 0.54 mm. An on-time/off-time ratio of about 1:3 was employed for this machining operation. The roughness by this conventional EDM technique was thus about 600% greater while the machining time was more than 12 times greater than that resulting from the process of the present invention at a loss of accuracy of less than 7½%.

When the same setup was used for electrochemical machining of the same workpiece, the time required was about 15 minutes, the total power consumption being exclusively the same as that employed for the method of the present invention. Similar roughness and a slightly poorer reproduction accuracy were observed.

I have also discovered that the use of a machining medium having a specific resistivity in the range of $10^{-1}$ to $10^2$ ohm-cm. is advantageous in that it permits ready adjustment of the proportion of spark-discharge machining and electrochemical erosion merely by modifying the specific resistivity of the medium in that range. Thus, as can be seen from FIG. 2, a specific resistivity of the medium between substantially 10 and 20 ohm-cm. will permit a substantial balance between the spark-discharge effect and the electrochemical machining effect with a pulsating direct-current source as described with reference to FIG. 1 or FIG. 4. A reduction of the specific resistivity (corresponding to an increase in the conductivity of the medium) will effect an increase in the electrochemical-machining character as the specific resistivity approaches $10^{-1}$ ohm-cm. whereas an increase in the specific resistivity (increasing dielectric character) toward $10^2$ ohm-cm. will result in a greater effect of the spark-discharge erosive action. Using the adjustable valve means 26 and 27 of FIG. 1, therefore, it is possible to control the accuracy and finish of the machining process to an optimum without the need for electrical or electronic systems coupled with the power supply. The proportion of electrochemical machining and electric discharge machining can also be modified by varying the relative power of the electric discharge pulses supplied to the electrodes with respect to the mean direct-current power.

It will be further noted that the system of the present invention is a significant improvement over earlier systems of the EBM type in which the spark-discharge was generated through a dielectric or insulating medium. In such cases, the rapid heating and quenching of the surface of the metal subject to the machining operation decreased the resistance of the metal to fatigue and therefore had a destructive influence on the body itself. Furthermore the spark-discharge action, especially when the dielectric liquid was an organic medium which tended to decomposition upon breakdown to sustain the spark-discharge, produced the carburization of the workpiece surface which also was undesirable as a consequence of the embrittlement of the surface treated. The system of the present invention, in spite of the fact that it makes use of spark-discharge machining, albeit in combination with an electrochemical machining, is found to be free of the repeated quenching and heating effects as well as devoid of any tendency toward carburization.

The invention described and illustrated is believed to admit of many modifications within the ability of persons skilled in the art, all such modifications being considered within the spirit and scope of the appended claims.

I claim:

1. An apparatus for electrically machining a conductive workpiece, comprising:
   an electrode juxtaposable with said workpiece and having a surface confronting a surface of said workpiece;
   means for supplying between said surfaces a liquid machining medium having a specific resistivity between substantially $10^{-1}$ and $10^2$ ohm-cm.;
   a first source of electric current connectable across said electrode and said workpiece for applying thereto a substantially unidirectional component poled to erode electrochemically said surface of said workpiece; and
   a second source of electric current connectable across said electrode and said workpiece for applying between said surfaces a pulsating component of a magnitude sufficient to effect spark discharge through said medium and between said surfaces for the discharge erosion of said surfaces of said workpiece.

2. An apparatus as defined in claim 1 wherein said means for supplying said medium between said surfaces includes circulating means forming a circulating path for said medium, sensor means along said path responsive to the electrical conductivity of said medium, and compensating means operable by said sensor means for restoring the conductivity of said medium upon the sensing of a deviation of the conductivity of said medium from a predetermined range.

3. An apparatus as defined in claim 1 wherein at least one of said sources is provided with timer means for applying the responsive electric current across said workpiece and said electrode intermittently at a frequency substantially less than the pulse frequency of said second source.

4. An apparatus as defined in claim 3 wherein at least one of said sources includes a source of direct current, electronic switch means connected in circuit between said source of said direct current and said electrode and said workpiece, and a multivibrator oscillator operatively connected with said electronic switch means for periodically triggering same.

References Cited

UNITED STATES PATENTS

| | | | |
|---|---|---|---|
| 3,275,538 | 9/1966 | Haupt et al. | 204—228X |
| 3,276,976 | 10/1966 | Juliard | 204—228X |

JOHN H. MACK, Primary Examiner

D. R. VALENTINE, Assistant Examiner

U.S. Cl. X.R.

204—228; 219—69